Dec. 16, 1952    G. G. E. AUGEREAU    2,621,987
OIL-LUBRICATED BEARING BLOCK
Filed Feb. 7, 1947
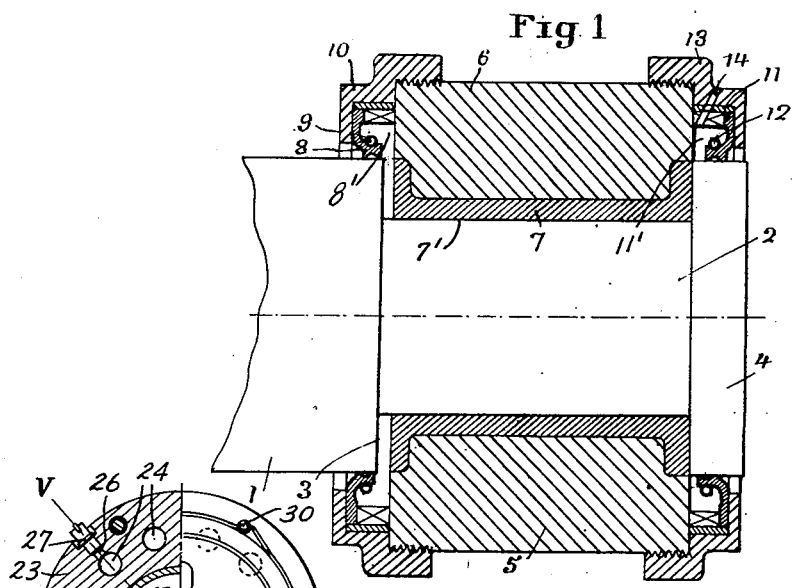
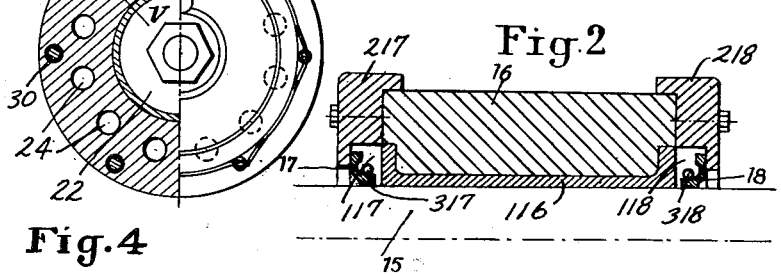
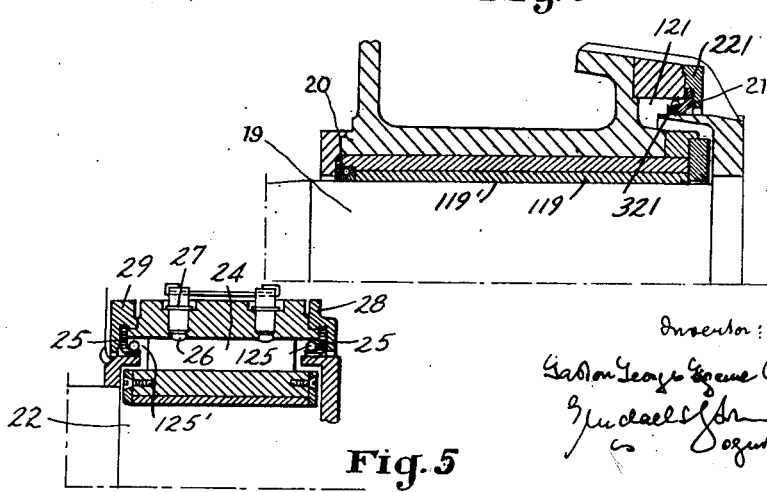
Inventor:
Gaston George Eugene Augereau Patented Dec. 16, 1952

2,621,987

UNITED STATES PATENT OFFICE 2,621,987

OIL-LUBRICATED BEARING BLOCK

Gaston Georges Eugène Augereau, Paris, France

Application February 7, 1947, Serial No. 727,255
In Switzerland February 23, 1946

9 Claims. (Cl. 308—122)

The present invention relates to a high-speed shaft bearing having a hydrodynamic system of lubrication.

In a hydrodynamic system of lubrication, it is a movement of the surfaces to be lubricated which develops forces analogous to those which are produced within a pump so as to obtain a pumping effect on the lubricant.

It is an object of the present invention to provide high-speed shaft bearings having a hydrodynamic system of lubrication which allows to obtain a sufficient fluid-tightness of the joints of the bearing.

According to the present invention a shaft bearing, comprises in combination, a shaft having a journal, a bearing box arranged so as to enclose at least the journal of the shaft, a bush bearing arranged in the bearing box and surrounding the journal of the shaft, the bush bearing having a bearing surface, a lubricant-containing annular chamber formed in the bearing box, the bearing surface of the bush bearing having an end communicating on the entire periphery thereof with the chamber, and means arranged at the entry of the shaft into the bearing box for making the bearing box and the chamber fluid-tight, whereby the bearing surface and the journal of the shaft act as a pump drawing lubricant from the chamber so that the journal of the shaft is embedded in molecules of the lubricant.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

The attached drawing shows diagrammatically several embodiments of bearing-blocks in accordance with the invention;

Fig. 1 is an axial section of a bearing-block intended for use with a shaft carrying a shoulder;

Fig. 2 is a similar view for a shaft that is not provided with a shoulder.

Fig. 3 shows schematically, the application of the invention to a bearing-block on an electric motor of special construction.

Fig. 4 is an end elevation, partly in transverse section along the line IV—IV in Fig. 5, of a small locomotive coupling rod end; and Fig. 5 is a section along the line V—V in Fig. 4.

In the embodiment according to Fig. 1, the shaft 1 is fitted with a shaft-end or journal 2 of smaller diameter thus leading to the formation of a shoulder 3 whereas the shaft-end terminates, at its free end, in a head 4.

The journal 2 is journalled in a bearing block comprising a bearing box constituted by a pillow 5, 6 and two caps 10 and 13 held in place by means of bolts (not shown). Furthermore the bearing box contains a bush bearing 7 surrounding the journal 2 and having a substantially cylindrical bearing surface 7'. On the shaft side the bearing box is provided with a lubricant containing annular chamber 8' with which one end of the bearing surface 7' communicates on the entire periphery thereof. The annular chamber 8' is rendered fluid-tight by means of a suitable packing 8 held against the shaft 1 and against the bearing cap 10 by means of a flexible band 9.

On the journal end side a lubricant-containing annular chamber 11' is provided, a wall portion of which is formed by a packing 11 held against the body of the bearing cap 13 and the head 4 by means of a flexible band 12.

In that way is accomplished a closed enveloping device being completely fluid-tight and insulating the bearing surfaces of the journal 2 in such a manner that if oil is introduced through a filling opening provided at 14 for instance, the oil will run into all the hollows existing between the parts composing the rotating device; the level of the oil is located substantially at the lower extremity of the filling opening 14. The oil thus introduced into the interior of the bearing-block creates therefore a system of hydrodynamic lubrication under hydrostatic pressure of the shaft 1 in the bush bearing 7. The filling opening is closed in fluid-tight manner so that the interior of the bearing-block is rendered a tightly closed cavity.

Furthermore, on account of the revolving movement of the journal 2 in relation to its bearing surface, the journal acts exactly like a pump and sets up continual movement of the oil or other lubricant, constantly supplying the lower part of the said journal with the oil that is lodged in the upper part of the said journal causing the oil in question to flow over the entire circumference of the journal; in that manner the latter is always surrounded by molecules of oil in movement, introduced between it and its bearing surface in such a way that as it were a roller bearing-block is obtained in which the rollers are constituted by molecules of lubricant present between the journal and its bearing surface.

It should be understood that realisation of the invention can differ according to the shape of the bearing-block: in the case of a shaft fitted with a journal of the same diameter as the body of the shaft, the arrangement would be, for instance, such as shown in Fig. 2 wherein 15 indicates the shaft, 16 the body of the bearing-block, 111 the bush bearing and 17, 18 represent the fluid-tight packings. The fluid-tight packing 17 forms a wall portion of the annular chamber 117, another wall portion of which is formed by the cap 217, a flexible band 317 holding the packing 17 against the shaft 15 and the cap 217. Similarly on the other side of the bearing block the fluid-tight packing 18 forms a wall portion of the lubricant containing annular chamber 118, another wall portion of which is formed by the cap 218. The packing 18 is held in position by a flexible band 318.

Fig. 3 shows another embodiment of the present invention applied to a more delicate case, comprising a shaft 19 of an electric motor of special construction, the fluid-tight packings of which are shown in 20, 21. The packing 21 forms a wall portion of the lubricant-containing annular chamber 121 communicating with one end of the bearing surface 119' of the bush bearing 119. The packing 21 is held in position by a flexible band 321. The packing 21 abuts against the cap 221.

Figs. 4 and 5 show the application of the invention to a small coupling rod end for locomotives. The journal is shown at 22 and the body of the small coupling rod end is provided with long grooves 24 in free communication with the fluid-tight chambers 125, 125' limited by the packings 25, 25', respectively. The filling openings 26 for the lubricant are equipped with stoppers 27. The lateral covers 28, 29 that can slide freely on the body 23 are joined to each other by screws 30.

It will be understood that each of the elements described above, or two or more together, may also find a useful application in other types of shaft bearings differing from the types described above.

While the invention has been illustrated and described as embodied in a shaft bearing having a hydrodynamic system of lubrication, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim is:

1. In a bearing for a heavily loaded shaft such as a railway journal having a hydrodynamic system of lubrication, in combination, a shaft having a large portion and a reduced portion of smaller diameter than said large portion; a bearing box having an aperture adapted to receive said reduced portion of said shaft; a bush bearing entirely surrounding said reduced portion of said shaft and having substantially cylindrical bearing surfaces; a cap rigidly connected to one end of said bearing box and surrounding said large portion of said shaft, said cap forming a chamber adapted to hold lubricant with said large portion of said shaft and said bearing box; and a fluid tight closure member arranged on said large portion of said shaft and abutting against the inner wall of said cap, whereby a system of hydrodynamic lubrication under hydrostatic pressure of said shaft in said bush bearing is created.

2. In a bearing for a heavily loaded shaft such as a railway journal having a hydrodynamic system of lubrication, in combination, a shaft having a large portion and a reduced portion of smaller diameter than said large portion; a bearing box having an aperture adapted to receive said reduced portion of said shaft; a bush bearing entirely surrounding said reduced portion of said shaft and having substantially cylindrical bearing surfaces; a cap rigidly connected to one end of said bearing box and surrounding said large portion of said shaft, said cap forming a chamber adapted to hold lubricant with said large portion of said shaft and said bearing box; a fluid tight closure member arranged on said large portion of said shaft and abutting against the inner wall of said cap; and a flexible band arranged on said closure member and holding same in position on said large portion of said shaft and pressing same into fluid tight engagement with said large portion of said shaft and the inner wall of said chamber, whereby a system of hydrodynamic lubrication under hydrostatic pressure of said shaft in said bush bearing is created.

3. A high-speed shaft bearing having a hydrodynamic system of lubrication, comprising in combination, a shaft having a journal; a bearing box arranged so as to enclose at least said journal of said shaft; a bush bearing arranged in said bearing box and surrounding said journal of said shaft, said bush bearing having a bearing surface; a lubricant-containing annular chamber formed in said bearing box, said bearing surface of said bush bearing having an end communicating on the entire periphery thereof with said chamber; and means arranged at the entry of said shaft into said bearing box for making said bearing box and said chamber fluid-tight, whereby said bearing surface and said journal of said shaft act as a pump drawing lubricant from said chamber so that said journal of said shaft is embedded in molecules of the lubricant.

4. A high-speed shaft bearing having a hydrodynamic system of lubrication, comprising in combination, a shaft having a journal; a bearing box arranged so as to enclose at least said journal of said shaft; a bush bearing arranged in said bearing box and surrounding said journal of said shaft, said bush bearing having a substantially cylindrical bearing surface; a lubricant-containing annular chamber formed in said bearing box, said bearing surface of said bush bearing having an end communicating on the entire periphery thereof with said chamber; and means arranged at the entry of said shaft into said bearing box for making said bearing box and said chamber fluid-tight, whereby said bearing surface and said journal of said shaft act as a pump drawing lubricant from said chamber so that said journal of said shaft is embedded in molecules of the lubricant.

5. A high-speed shaft bearing having a hydrodynamic system of lubrication, comprising in combination, a shaft having a journal; a bearing box arranged so as to enclose at least said journal of said shaft; a bush bearing arranged in said bearing box and surrounding said journal of said shaft, said bush bearing having a substantially cylindrical bearing surface; a lubricant-containing annular chamber formed in said bearing box, said bearing surface of said bush bearing having an end communicating on the entire periphery thereof with said chamber; and means arranged, respectively, at the entry and exit of said shaft into and from said bearing box for making the entry and the exit of said shaft into and from said bearing box and said chamber fluid-tight, whereby said bearing surface and said journal of said shaft act as a pump drawing lubricant from said chamber so that said journal of said shaft is embedded in molecules of the lubricant.

6. A high-speed shaft bearing having a hydrodynamic system of lubrication, comprising in combination, a shaft having a journal; a bearing box arranged so as to enclose at least said journal of said shaft; a bush bearing arranged in said bearing box and surrounding said journal of said shaft, said bush bearing having a substantially cylindrical bearing surface; two lubricant-containing annular chambers formed, respectively, in said bearing box adjacent to the entry and exit of said shaft, said bearing surface of said bush bearing having ends communicating, respectively, on the entire periphery thereof with said chambers; and means arranged, respectively, at the entry and exit of said shaft into and from said bearing box for making the entry and the exit of said shaft into and from said bearing box and said chambers fluid-tight, whereby said bearing surface and said journal of said shaft act as a pump drawing lubricant from said chambers so that said journal of said shaft is embedded in molecules of the lubricant.

7. A high-speed shaft bearing having a hydrodynamic system of lubrication, comprising in combination, a shaft having a journal; a bearing box including a pillow and two caps arranged at the ends of said pillow; a bush bearing arranged in said pillow and surrounding said journal of said shaft, said bush bearing having a substantially cylindrical bearing surface; a lubricant-containing annular chamber formed by said pillow and one of said caps, said bearing surface of said bush bearing having an end communicating on the entire periphery thereof with said chamber; and means arranged in contact with said shaft and said one of said caps for making said chamber fluid-tight, whereby said bearing surface and said journal of said shaft act as a pump drawing lubricant from said chamber so that said journal of said shaft is embedded in molecules of the lubricant.

8. A high-speed shaft bearing having a hydrodynamic system of lubrication, comprising in combination, a shaft having a journal; a bearing box including a pillow and two caps arranged at the ends of said pillow; a bush bearing arranged in said pillow and surrounding said journal of said shaft, said bush bearing having a substantially cylindrical bearing surface; two lubricant-containing annular chambers, formed, respectively, by said pillow and said caps, said bearing surface of said bush bearing having ends communicating on the entire periphery thereof with said chambers; and means arranged in contact with said shaft and said caps for making said chambers fluid-tight, whereby said bearing surface and said journal of said shaft act as a pump drawing lubricant from said chambers so that said journal of said shaft is embedded in molecules of the lubricant.

9. A high-speed shaft bearing having a hydrodynamic system of lubrication, comprising in combination, a shaft having a journal; a bearing box including a pillow and two caps arranged at the ends of said pillow; a bush bearing arranged in said pillow and surrounding said journal of said shaft, said bush bearing having a substantially cylindrical bearing surface; two lubricant-containing annular chambers formed, respectively, by said pillow and said caps, said bearing surface of said bush bearing having ends communicating on the entire periphery thereof with said chambers; means arranged in contact with said shaft and said caps for making said chambers fluid-tight, whereby said bearing surface and said journal of said shaft act as a pump drawing lubricant from said chambers so that said journal of said shaft is embedded in molecules of the lubricant; and channel means arranged in said pillow and establishing a connection between said chambers.

GASTON GEORGES EUGÈNE AUGEREAU.

REFERENCES CITED

The following references are of record in the file of this patent:

UNITED STATES PATENTS

| Number | Name | Date |
| --- | --- | --- |
| 1,043,603 | Jones | Nov. 5, 1912 |
| 1,152,550 | Roberts | Sept. 7, 1915 |
| 1,254,909 | Howe | Jan. 29, 1918 |
| 1,872,788 | Mulhem | Aug. 23, 1932 |
| 2,294,105 | Wallgren | Aug. 25, 1942 |
| 2,356,027 | Boyd et al. | Aug. 15, 1944 |

FOREIGN PATENTS

| Number | Country | Date |
| --- | --- | --- |
| 53,857 | Sweden | Feb. 7, 1920 |
| 557,823 | France | Oct. 16, 1923 |
| 634,803 | Germany | Sept. 8, 1936 |
| 659,902 | Germany | May 12, 1938 |